UNITED STATES PATENT OFFICE.

HENRY A. GARDNER, OF WASHINGTON, DISTRICT OF COLUMBIA.

PIGMENT AND PROCESS OF MAKING THE SAME.

1,169,253.

Specification of Letters Patent.

Patented Jan. 25, 1916.

No Drawing.

Application filed March 9, 1915. Serial No. 13,277.

*To all whom it may concern:*

Be it known that I, HENRY A. GARDNER, a citizen of the United States, residing at Washington, in the District of Columbia, have invented certain new and useful Improvements in Pigments and Processes of Making the Same, of which the following is a specification.

This invention relates to certain novel pigments and to processes of making the same, the object of the invention being the production of pigments which contain salts of two or more metals, including lead and barium, which salts are in such a state of intimate association, or possibly even of chemical combination, that they show little or no tendency to segregate or stratify when combined with a paint vehicle or made into paints. This is in marked contradistinction to mixed pigments prepared by grinding the components. The new pigments are prepared by precipitation methods as hereinafter fully described.

It is known that when pigments such as the carbonates, sulfates or sulfites of lead, are mixed by grinding or otherwise with an equimolecular proportion of an insoluble salt of barium, as barium sulfate, a mixed pigment of deficient hiding power in oil is produced; and moreover, pigments thus prepared show a strong tendency to segregation in presence of the vehicle.

I have found that when pigments containing insoluble compounds of lead and barium are formed simultaneously by a process involving the precipitation of one or both of the salts from their aqueous solutions, the product is possessed of great hiding power or opacity, and its components do not exhibit the above-mentioned tendency to stratification; moreover, the product is decidedly more resistant to discoloration by hydrogen sulfid or the like.

The invention will be described by certain illustrative examples thereof, it being understood that it is not restricted to the particular proportions and conditions defined in the examples.

Example 1: An aqueous solution of a lead salt, such as the normal or basic acetate of lead, is mixed with an aqueous solution of a suitable barium compound, as barium hydroxid. Equimolecular proportions may be used. To the resulting clear solution there is added an aqueous solution of a soluble sulfite, as sodium sulfite, in quantity sufficient to react with and to precipitate the lead and barium as sulfites. Or if desired, I may pass gaseous sulfur dioxid through the clear solution with a like result. In the latter case it is preferred that a basic salt of lead should be used, and the passage of the gas is continued as long as a precipitate continues to form. The pigment thus produced is thoroughly washed with water and dried. It is a white product, and consists of the inseparably commingled sulfites of lead and barium.

Example 2: Aqueous solutions of suitable lead and barium compounds are mixed as above described, and the resulting clear solution is precipitated by an aqueous solution of a suitable carbonate, such as normal sodium carbonate, used in sufficient quantity to precipitate all of the lead and barium as their carbonates. In case basic acetate of lead is used, a like result may be obtained by passing carbon dioxid through the solution, so long as a precipitate forms. The precipitate consists in this case of the intimately combined and inseparably commingled carbonates of lead and barium. The lead carbonates may be either the normal or the basic salt, according to the conditions of the precipitation.

Example 3: To the clear solution containing dissolved compounds of lead and barium, is added an aqueous solution of a sulfate, such as sodium sulfate, so long as a precipitate is formed. The precipitate in this case will consist of intimately commingled or combined sulfates of lead and barium. Instead of using a simple precipitant, as described in the foregoing examples, it is sometimes desirable to employ a mixture of two or more precipitants, and thereby to produce a correspondingly complex precipitate.

Example 4: To a clear solution prepared by mixing equimolecular proportions of suitable soluble compounds of lead and barium, there is added a mixture of sodium carbonate, sodium sulfite, and sodium sulfate, these several precipitants being in equimolecular proportions, and the total quantity being sufficient for complete precipitation of the lead and barium. The resulting highly complex precipitate contains the corresponding insoluble salts both of lead and barium, and is treated as above described. Instead of the three precipitants above mentioned, any two of them may be used under conditions otherwise similar. By varying the ratio of the lead and barium compounds present in the solution before precipitation, pigments may be obtained which contain various predetermined percentages of either component. As a rule, however, I prefer to make a pigment which consists of approximately equimolecular proportions of the two salts. The hiding power of pigments so prepared is nearly equal to that of the pure lead salts, while they have a materially less tendency to darken under the influence of hydrogen sulfid.

Example 5: Lead hydroxid prepared in any suitable manner, as for example by agitating minutely subdivided metallic lead in presence of water, is suspended in a solution of barium hydroxid, the proportion of dissolved barium compound being preferably molecularly equivalent to the proportion of suspended lead compound. The mixture is then subjected to a current of carbon dioxid, whereupon a precipitate is formed which consists of an extremely intimate mixture of basic carbonate of lead with barium carbonate. It has been observed in this case that the absorption of the carbon dioxid by the lead is more rapid than when the latter is suspended in water for carbonating, which suggests that the dissolved barium hydroxid may serve as a carrier of carbon dioxid to the lead.

The pigments produced by any of the foregoing methods may, if desired, be treated by the known physical means to increase their opacity.

I claim:—

1. A precipitate of predetermined composition and suitable for use as a pigment, said precipitate consisting essentially of intimately commingled carbonates of lead and barium.

2. The hereindescribed method of making a pigment containing insoluble salts of lead and barium in predetermined proportions, which consists in preparing a mixture of lead and barium compounds in the desired proportions one at least of said compounds being a water-soluble salt, and simultaneously precipitating the metals from said mixture in the form of insoluble salts.

3. The hereindescribed method of making pigments containing insoluble carbonates of lead and barium in predetermined proportions, which consists in preparing a mixture of compounds of lead and barium, one at least of said compounds being a water-soluble salt, and simultaneously precipitating the metals from said mixture in the form of their carbonates.

4. The hereindescribed method of making pigments containing insoluble carbonates of lead and barium in predetermined proportions, which consists in preparing a mixture of lead and barium compounds in the desired proportions, one at least of said compounds being a water-soluble salt, and reacting on said mixture with carbon dioxid.

5. The herein-described method of making a pigment containing lead and barium carbonates, which consists in forming a basic carbonate of lead and precipitating barium carbonate in intimate association therewith.

In testimony whereof I affix my signature in presence of two witnesses.

HENRY A. GARDNER.

Witnesses:
N. P. LEONARD,
C. W. FOWLER.